E. O. ROTHMAN.
MACHINE FOR SAWING METALS.
APPLICATION FILED OCT. 2, 1913.

1,144,867.

Patented June 29, 1915.

WITNESSES
W. C. Baker Jr.
Geo. L. Beele

INVENTOR
EDWIN OLAF ROTHMAN
BY
ATTORNEYS

UNITED STATES PATENT OFFICE.

EDWIN OLAF ROTHMAN, OF LONDON, ENGLAND, ASSIGNOR TO SOCIÉTÉ BURTON FILS, OF PARIS, FRANCE.

MACHINE FOR SAWING METALS.

1,144,867.  Specification of Letters Patent.  Patented June 29, 1915.

Application filed October 2, 1913. Serial No. 792,979.

*To all whom it may concern:*

Be it known that I, EDWIN OLAF ROTHMAN, of 41 Great Percy street, in the city of London, W. C., England, have invented a Machine for Sawing Metals, of which the following is a full, clear, and exact description.

The invention has for its object a portable sawing machine, capable of being attached to a bench or any carrier, or on the piece to be cut itself, allowing to cut square or obliquely and to vary at will the pressure with which the saw is applied, according to the size of the piece and to the nature of the metal.

Figure 1:
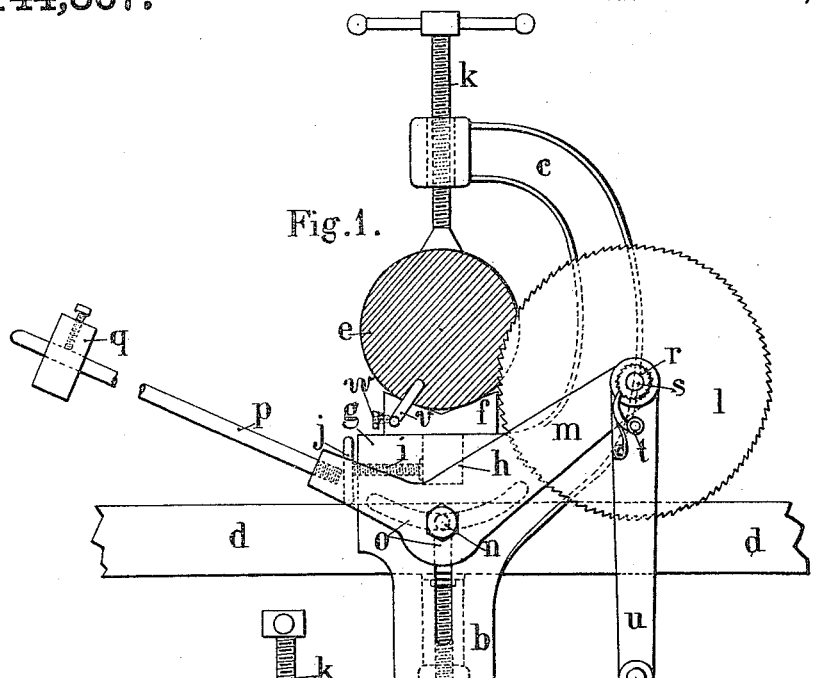
Figure 2:
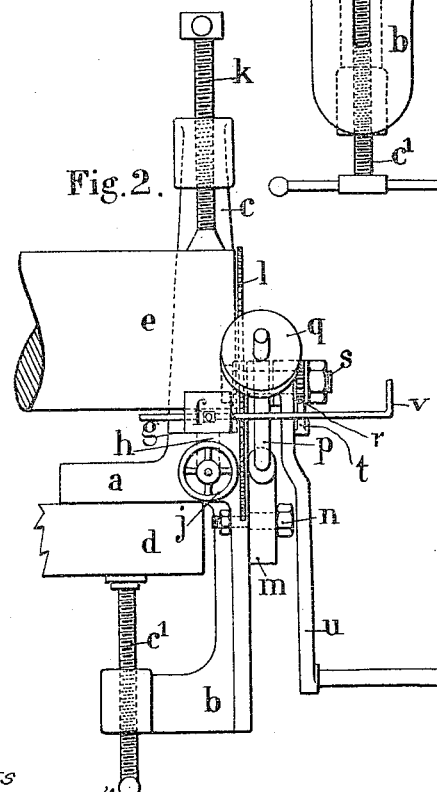

A method of carrying out the invention is illustrated, by way of example in the accompanying drawing in which:

Figure 1 is an elevation of the said machine for sawing or cutting metals; Fig. 2 is an end view of the same.

As illustrated in the drawing, the new machine comprises a frame $a$ having two arms $b$ and $c$ extending in perpendicular planes. The arm $b$ carries a screw $c'$ allowing to secure the machine on a bench $d$ or on any suitable carrier. The piece $e$ to be cut bears upon a carrier $f$ having any suitable shape. Said carrier $f$ rests upon a table $g$ of the frame $a$. This carrier $f$ has a pivot $h$ fitting in a corresponding recess provided in the table $g$, which allows to set at will the piece to be cut. A screw $i$ operated by a hand wheel $j$ allows of locking the carrier $f$ in the position chosen. A screw $k$ on the arm $c$ allows of clamping the piece to be cut.

Instead of the machine being mounted on a bench, or carrier, as illustrated, it may be simply attached to the piece $e$ itself, by means of the screw $k$. In this case, the piece to be cut supports the machine.

The saw $l$ is mounted at one end of a lever $m$ secured to the arm $b$ by means of a trunnion $n$ movable in a slot $o$ of suitable shape. A rod $p$ constitutes the extension of the other end of the lever $m$ and on this rod can move an adjustable weight $q$. Instead of producing the pressure by means of said weight $q$, the rod $p$ may be acted upon simply by means of the hand.

The saw is actuated by a ratchet wheel $r$ mounted on the axis $s$ of the saw and driven by a pawl $t$ on a crank $u$, or by any suitable lever loosely mounted on said axis $s$.

On the carrier $f$ and on its side slides a rod $v$ curved at its end; a set screw $w$ can hold said rod stationary in the required position and the piece to be cut abuts against this rod $v$, when it is desired to obtain a series of pieces or portions of the same length. The operation of the new machine is as follows:—The frame $a$ being secured on the bench or carrier $d$ by means of the screw $c'$, the piece $e$ to be cut is placed on the carrier $f$ which is set, by a suitable rotation about the pivot $h$, in the required position relatively to the plane of the saw. The carrier is then locked by means of the screw $i$. The rod $v$ is adjusted to a length corresponding to that of the portion or portions it is desired to obtain and the piece to be cut is secured on the carrier by means of the upper set screw $k$. The adjustable trunnion $n$ is then released and moved in its slot until the saw takes a suitable position relatively to the piece $e$, according to the size of the piece or according to the place or point where it is desired to produce the beginning of the cutting action of the saw; then the trunnion $n$ is locked. Finally a rotary motion is imparted to the saw either by the continuous movement of the crank $u$, if its range of action is not obstructed by the extension of the piece $e$, or, on the contrary, by a reciprocating movement which is rendered possible by the provision of the pawl wheel $r$.

It will be seen that the present machine offers the main following advantages: easy attachment on any table or bench, or on the piece itself; possibility of setting the cutting plane in any manner whatever and to vary the pressure of the saw; possibility of actuating the machine in a continuous or discontinuous manner, by hand or mechanically; finally possibility of cutting pieces of very different sizes or to begin to saw one and the same piece at very different points or places.

The characteristic arrangements of the new machine are not only applicable to the saws proper, but also to any machines provided with circular cutting tools actuated by hand or mechanically.

The above arrangements are given by way of example only, the forms, sizes and detail devices may be varied according to circumstances without modifying the principle of the invention as defined by the appended claims.

Claims:

1. In a machine for sawing metals, a circular saw, a lever supporting said saw, a trunnion on which pivots said lever, and a frame having a slot in which said trunnion can move.

2. In a machine for sawing metals, a circular saw, a lever supporting said saw, a trunnion on which pivots said lever, a frame having a slot in which said trunnion can move, and means for securing the trunnion in its slot to said frame.

3. In a machine for sawing metals, a circular saw, a bent lever supporting said saw, a trunnion on which pivots said lever, and a frame having a curved slot in which said trunnion can move.

4. In a machine for sawing metals, a circular saw, a crank and a locking mechanism for controlling the saw, a lever supporting said saw, a trunnion on which pivots said lever, and a frame having a slot in which said trunnion can move.

5. In a machine for sawing metals, a circular saw, a lever supporting said saw, a trunnion on which pivots said lever, a frame having a slot in which said trunnion can move, and an adjustable weight on the lever.

6. In a machine for sawing metals, a circular saw, a lever carrying said saw, an arm with a screw for securing the machine on a bench, another arm in a plane perpendicular to that of the first-named arm, and a screw in the second-named arm for clamping the piece to be cut.

7. In a machine for sawing metals, a circular saw, a rotating and sliding lever carrying said saw, an arm with a screw for securing the machine on a bench, another arm in a plane perpendicular to that of the first-named arm, and a screw in the second-named arm for clamping the piece to be cut.

8. In a machine for sawing metals, a circular saw, a rotating and sliding lever carrying said saw, a rotating carrier for the piece to be cut, and means for holding said carrier stationary.

The foregoing specification of my machine for sawing metals signed by me, this 16th day of September 1913.

EDWIN OLAF ROTHMAN.

Witnesses:
FRANCIS ABREY GARWOOD,
WALTER BENJAMIN TURNER.

Copies of this patent may be obtained for five cents each, by addressing the "Commissioner of Patents, Washington, D. C."